Patented May 30, 1939

2,160,036

UNITED STATES PATENT OFFICE 2,160,036

PROCESS OF MAKING LIQUORS

Abraham Shapiro, Chicago, Ill.

No Drawing. Application May 22, 1936,
Serial No. 81,340

3 Claims. (Cl. 99—37)

This invention relates to a process of making liquor.

One of the objects of my invention is to produce a whiskey from a grain which has been processed to definite required specifications so as to permit an effective control of its fermentation.

Another object is to provide as the fermentable substance in whiskey production, a grain which has been refined to a crude starch and rendered substantially free from whiskey producing substances.

Another object is to produce a whiskey, from a corn which has been refined to a crude starch and rendered substantially free from whiskey producing substances and which can be controlled in its process of fermentation.

Another object is to produce whiskey by making use of a grain form which all of the protein matter has been substantially removed, and adding thereto, during the fermentation process, protein matter to control the flavor characteristics of the liquor.

Another object is to eliminate the direct handling of the whole grain and the preliminary processing by liquor distillers, and to provide in lieu thereof a grain processed (by corn refiners) to definite specifications to permit the production of the whiskey with a minimum of operations.

In the practice of my invention, I make use of a substance known as "corn grit", a term applied to a product of the corn refineries. Corn grit is a crude starch, partially refined, from which the oils and proteins have been removed and which has been rendered substantially free from micro-organisms. In this condition the corn grit is not capable of fermentation unless nutrient and micro-organisms are added thereto. Its condition as corn grit is such that it requires a minimum of treatment to convert it into fermentable sugars, thus eliminating the preliminary processing by the distiller. By using the corn grit as the fermenting substance, the distiller avoids the risk of variation in quality, mould, and deterioration incident to the handling of the whole grain. The corn grit can be purchased to conform to definite chemical specifications as regards quality and quantity of composition. It is this fact that makes its use so advantageous in the production of liquor, because its permits an effective control of the whole process.

In practicing my invention I first produce a culture of micro-organisms native to the particular grain or grains, the characteristic flavors of which are to be imparted to the ultimate product. The culture is prepared in the manner disclosed in my co-pending application, Serial No. 77,715. The initial culture of micro-organisms is best made by using approximately 10 parts (parts whenever referred to herein means parts by weight) of the grain (rye for rye whiskey, corn and rye for bourbon, etc.), one-half in malted form and the other one-half in its natural state. To this is added protein matter in the following proportions, for the purpose of controlling the character of the whiskey: one-half part of green pea proteins, one-half part of soy bean proteins, one-half part of corn proteins, such as steep water and 75 parts of water. A corn sugar solution is then added consisting of 16 parts of sugar dissolved in 65 parts of water. It will be understood, however, that the proportion parts of the malt and natural grain can be varied as by using either ten parts of malted grain or ten parts of natural grain or by mixing the malted and natural grain in other proportions. It is likewise understood that the protein matter can be varied in different proportions and combinations. The use of greater or lesser proportions of one or more of the leguminous plants in combination with the corn protein, together with the micro-organisms has the effect of determining the resulting flavor of the liquor, for example, the use of a larger proportion of green peas will give the liquor a a brandy flavor, while the use of a larger proportion of soy beans gives the liquor a rye flavor, and the use of a greater amount of corn protein will give a bourbon flavor. The above mass is kept at a temperature of about eighty-five (85) degrees F. for about three days to promote the general growth of the organisms. If it is desired to produce brandies, ten (10) parts of the particular ripe fruit are used in place of the grain as hereinbefore described, and the process is then continued precisely in the same manner as before explained.

The culture as above produced is then introduced into the fermenting mash.

The corn grit which I use as the bulk fermenting substance, is cooked and mashed with malt to convert the starch into sugar in the same manner as where other whole grains are used. During the process of malting, the culture of micro-organisms which I have prepared is introduced into the mash and protein matter influencing the character of the whiskey is added. I have found that the following proteins are desirable. Soya bean proteins, mixed in combination with corn protein (steep water). The use of greater or lesser proportions of one or the other of the proteins together with the microorganisms has the effect of determining the resulting flavor of the liquor, for example, the use of a larger proportion of soya beans gives the liquor a rye flavor while the use of a greater proportion of corn proteins will give the liquor a bourbon flavor. The mash is permitted to ferment after which the liquor is distilled off in the usual manner.

What I desire to secure by Letters Patent is:

1. The process of producing distilled liquors of controlled, predetermined flavor, such as whiskeys, which comprises inoculating a mash of deproteinated corn grain with a culture of yeast fermenting the mash in the presence of predetermined amounts of corn and soy bean so chosen as to impart a predetermined flavor to the product and distilling the fermented product to recover the flavor of an alcoholic distillate.

2. The process of producing whiskey which comprises, introducing a culture of yeast into a mash, the amylaceous content of which is derived from corn grits, adding to the mash a quantity of nutrients comprised of respectively predetermined amounts of corn and soy bean proteins; fermenting the material, distilling and recovering from the fermented products a flavored alcoholic distillate.

3. A process of producing distilled liquors of predetermined flavor characteristics which comprises, treating a mash of corn grits, substantially freed from the natural corn proteins, with malt, inoculating the mash with a culture of yeast; adding to the mass a predetermined quantity of corn and soy bean proteins, such proteins being respectively proportioned so as to produce a predetermined ultimate flavor; fermenting the mass and distilling and recovering an aqueous alcoholic concentrate of predetermined and characteristic flavor.

ABRAHAM SHAPIRO.